(12) United States Patent
Bingham

(10) Patent No.: US 8,104,651 B2
(45) Date of Patent: Jan. 31, 2012

(54) VEHICLE ROOF RACK END SUPPORT

(75) Inventor: Paul Joseph Bingham, West Ryde (AU)

(73) Assignee: Cequent Performance Products, Inc., Plymouth, MI (US)

( * ) Notice: Subject to any disclaimer, the term of this patent is extended or adjusted under 35 U.S.C. 154(b) by 936 days.

(21) Appl. No.: 10/576,456

(22) PCT Filed: Oct. 15, 2004

(86) PCT No.: PCT/IB2004/003379
§ 371 (c)(1),
(2), (4) Date: Dec. 22, 2006

(87) PCT Pub. No.: WO2005/037606
PCT Pub. Date: Apr. 28, 2005

(65) Prior Publication Data
US 2007/0108243 A1    May 17, 2007

(30) Foreign Application Priority Data
Oct. 20, 2003    (AU) ............... 2003905761

(51) Int. Cl.
*B60R 9/04* (2006.01)
(52) U.S. Cl. ............... 224/315; 224/322; 224/326
(58) Field of Classification Search .......... 224/315, 224/321, 322, 325, 326, 329, 330, 331
See application file for complete search history.

(56) References Cited

U.S. PATENT DOCUMENTS

| | | | |
|---|---|---|---|
| 4,993,615 A * | 2/1991 | Arvidsson | 224/309 |
| 5,002,216 A * | 3/1991 | Gerber | 224/329 |
| 5,025,967 A * | 6/1991 | Cronce et al. | 224/326 |
| 5,195,669 A * | 3/1993 | Duemmler | 224/315 |
| 5,366,128 A * | 11/1994 | Grim | 224/330 |
| 5,385,285 A * | 1/1995 | Cucheran et al. | 224/321 |
| 6,158,638 A * | 12/2000 | Szigeti | 224/310 |
| 6,662,982 B1 * | 12/2003 | Pakkila | 224/329 |
| 6,959,844 B2 * | 11/2005 | Potter et al. | 224/321 |
| 6,997,657 B1 * | 2/2006 | Saward | 410/106 |

FOREIGN PATENT DOCUMENTS

| | | | |
|---|---|---|---|
| DE | 4315029 | | 11/1994 |
| DE | 102004046221 | * | 4/2005 |
| EP | 694441 A1 | * | 1/1996 |
| FR | 2807722 | | 10/2001 |
| FR | 2832371 A1 | * | 5/2003 |

OTHER PUBLICATIONS

Translation of Poulet FR 2832371.*
Translation of Poulet FR 2832371, Accessed Jul. 4, 2011.*
Int'l Written Opinion, Jun. 17, 2005, ISA.

* cited by examiner

*Primary Examiner* — Justin Larson
(74) *Attorney, Agent, or Firm* — McDonald Hopkins LLC

(57) ABSTRACT

A support assembly to support a bar (11) of a roof rack assembly for a motor vehicle includes a base (12) to which the bar (11) is attached. The bar (11) includes a longitudinal cavity (46) that provides for the attachment of articles to the bar (11). The support assembly further includes a cover (24) that is captively attached to the base (12) but movable relative thereto between a lock position preventing access to a threaded shaft (18) that is used to secure the support assembly to the vehicle and the cavity (46), and a displaced position providing access to the cavity (46) and threaded shaft (18).

21 Claims, 4 Drawing Sheets

VEHICLE ROOF RACK END SUPPORT

This is a U.S. National Stage Application of International Patent Application Ser. No. PCT/IB2004/003379 filed Oct. 15, 2004, which claims priority to Australian. Provisional Patent Application No. 2003905761 filed on Oct. 20, 2003.

TECHNICAL FIELD

The present invention relates to support assemblies to secure a roof bar to a vehicle roof mounting, and more particularly but not exclusively the present invention relates to end supports of vehicle roof rack assemblies.

BACKGROUND OF THE INVENTION

Available roof rack assemblies include an end support that engages a gutter, roof channel or mounting rail of the vehicle roof. Typically, a strap or other device is tensioned to securely attach the end support to the vehicle. The apparatus that tensions the strap is exposed and is vulnerable to unauthorised manipulation to release the mounting. Accordingly, previously known roof racks are vulnerable to theft.

Roof rack assemblies that address the above problem are either difficult to operate or are aesthetically unattractive.

OBJECT OF THE INVENTION

It is the object of the present invention to overcome or substantially ameliorate at least one of the above disadvantages.

SUMMARY OF THE INVENTION

There is disclosed herein a support assembly to secure a roof bar, having a longitudinal mounting portion via which articles are secured to the bar, to a vehicle roof mounting so that in use the bar extends generally transversely across the vehicle, said assembly including:
a base to which the bar is to be secured;
a user manipulated part mounted in the base and operated by a user to secure and release the assembly with respect to the vehicle mounting;
a movable cover mounted on the base to inhibit access to said part and longitudinal mounting portion, the cover being releasable relative for movement to the base to expose said part and mounting portion; and
a lock operatively associated with the base and cover to secure the cover to said base to inhibit access to said part and longitudinal mounting portion, and operable to release the cover for the movement relative to said base.

Preferably, said cover is captively attached to said base.

Preferably, said movement includes pivoting movement about an axis and movement along a predetermined path.

Preferably, said axis is generally horizontal when said assembly is secure to said vehicle.

Preferably, said path is located generally in a vertical plane when said assembly is secured to a vehicle.

Preferably, said movement is provided by projections on said cover slidably engaged in tracks in said base.

Preferably, said lock includes a lock cylinder mounted in said cover and operable to engage said base.

Preferably, said base has a cavity via which the user has access to said part, with said cover being movable relative to said base to close said cavity to inhibit said access.

Preferably, said part is a threaded shaft having a longitudinal axis, with the user causing angular movement of said shaft to secure and release the assembly with respect to the vehicle, with said shaft being slidably supported in said base for angular movement about said longitudinal axis.

Preferably, said longitudinal axis is generally vertically extending when said assembly is mounted on the vehicle.

Preferably the assembly includes a securing member mounted in the base and to engage the vehicle mounting, which securing member is tensioned by said part to inhibit relative movement between the vehicle and assembly.

Preferably, said securing member is a strap assembly including a strap body to extend between the base and vehicle mounting, and a threaded portion threadably engaged with said shaft so that movement of said threaded portion changes the tension in said strap when said strap is engaged with the vehicle mounting.

Preferably, said strap includes an eyelet.

Preferably, said lock cylinder is key operable and includes a projection that is angularly movable between a first position engaged with said base to retain the cover in a position covering said cavity, and a second position releasing the cover with respect to the base.

Preferably, said assembly includes a mounting adaptor that is to be secured to the vehicle mounting, and wherein said part threadably engages said adaptor and is tensioned to secure the assembly to the vehicle.

Preferably, said assembly includes a securing member attached to the base to secure the bar to the base, and wherein said securing member is accessible only when said cover is positioned to provide access thereto.

Preferably, said securing member is a threaded fastener threadably engaged with said base and is to pass through said bar.

There is further disclosed herein in combination, the abovementioned support assembly and the roof bar, and wherein said mounting portion includes at least one longitudinal flange.

Preferably, said mounting includes two longitudinally extending flanges and an associated cavity via which said articles are secured to said bar.

BRIEF DESCRIPTION OF THE DRAWINGS

A preferred form of the present invention will now be described by way of example with reference to the accompanying drawings wherein.

DETAILED DESCRIPTION OF THE PREFERRED EMBODIMENTS

Figure 1:
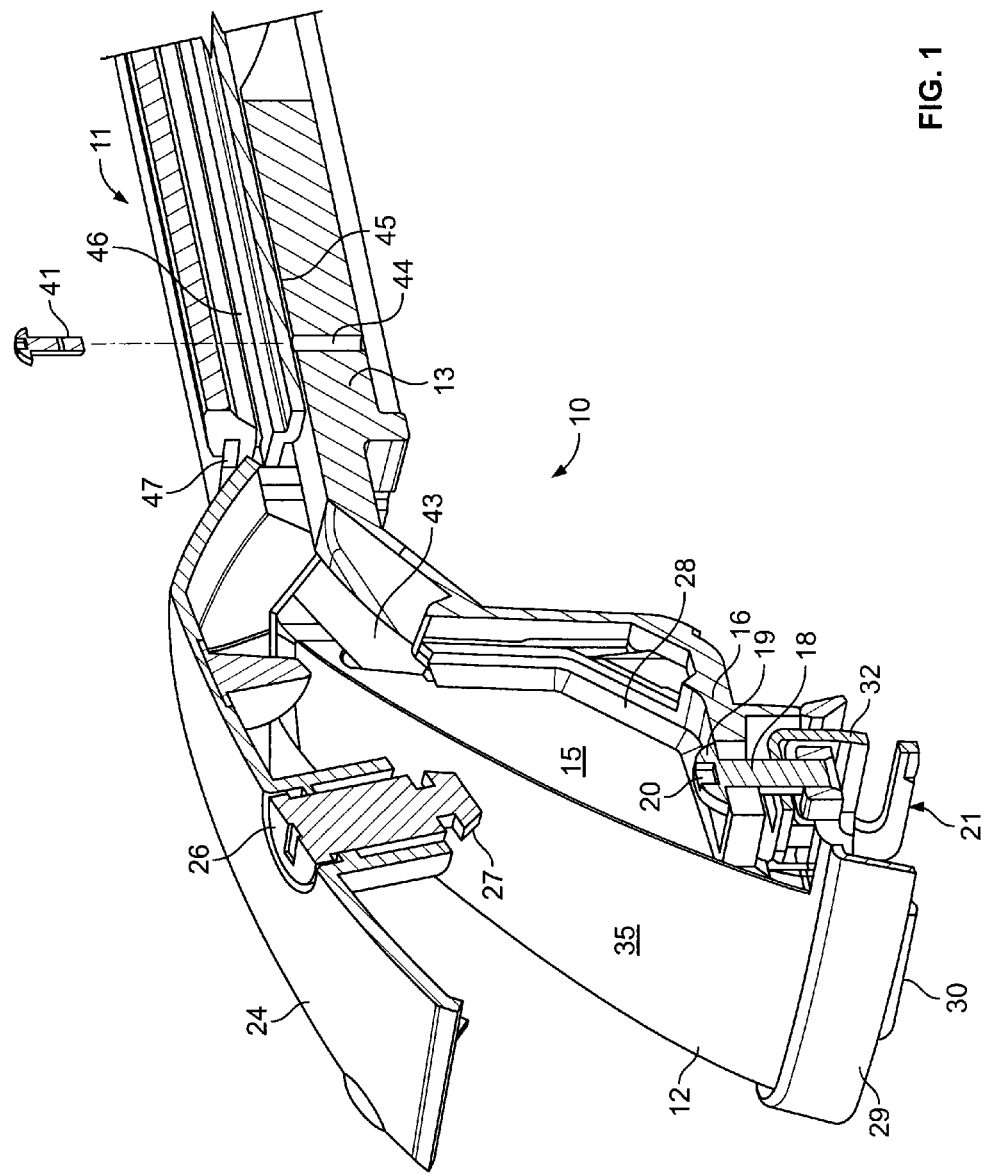
FIG. 1 is a schematic part sectioned isometric view of an end mounting and roof bar of a vehicle roof rack assembly.
Figure 2:
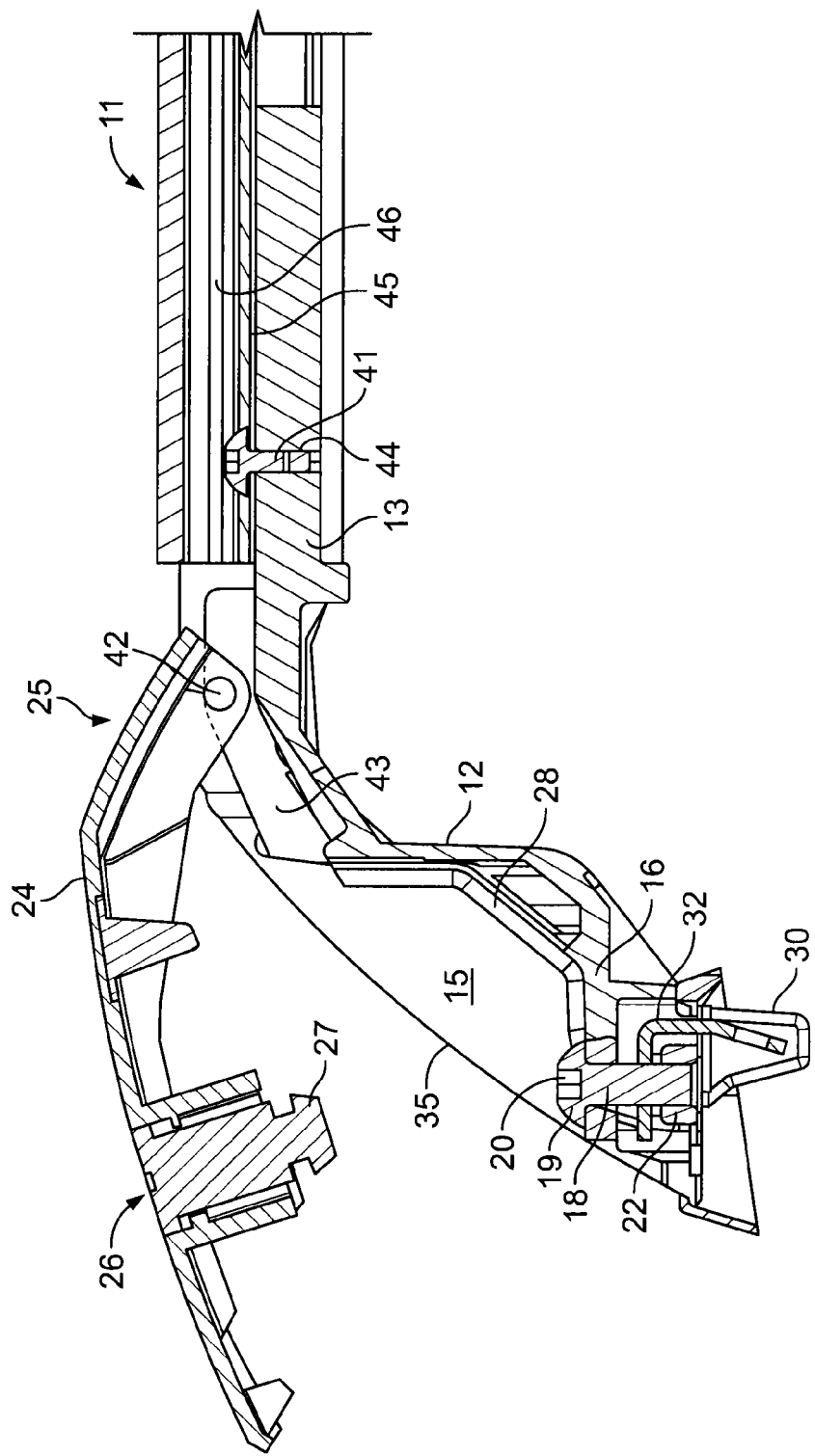
FIG. 2 is a schematic side elevation of the end mounting and bar of FIG. 1.
Figure 3:
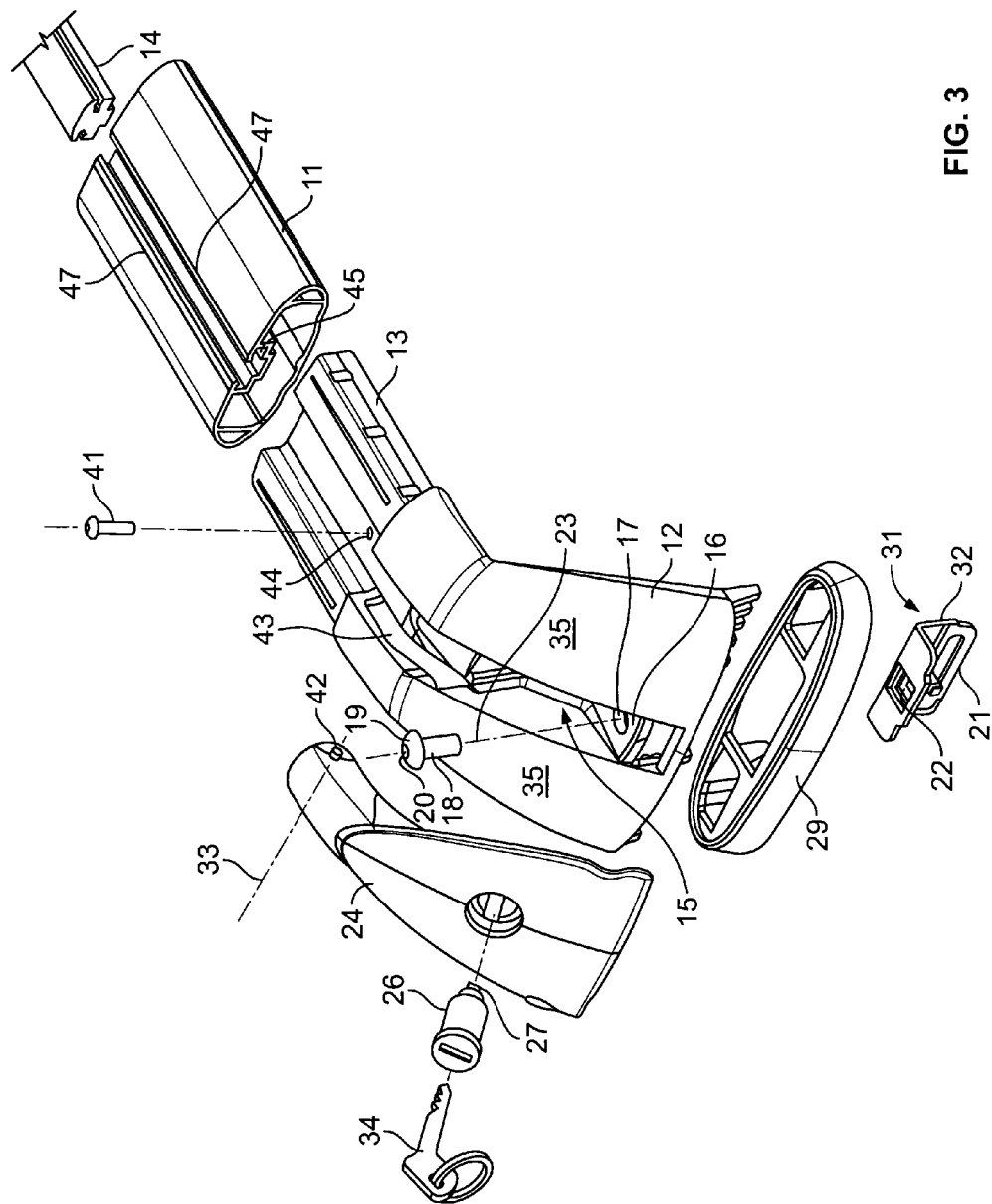
FIG. 3 is a schematic parts exploded perspective view of the mounting and bar of FIGS. 1 and 2.

In FIGS. 1 to 3 of the accompanying drawings there is schematically depicted portion of a roof rack assembly that would normally extend transversely across the roof of a vehicle and engage the mounting rails of the vehicle roof. More particularly in the accompanying drawings there is schematically depicted an end support assembly 10 to which there is attached a bar 11 of the roof rack assembly. Typically, the bar 11 would have a support assembly 10 at each extremity, with lock support assembly 10 engaging a respective one of the vehicle mounting rails. The bar 11 has a longitudinal cavity 46 associated with mounting flanges 47.

The assembly 10 includes a base 12 to which the bar 11 is attached. More particularly the base 12 has a projection 13 that is received within the bar 11 so as to be secured thereto. Typically the bar 11 would be a hollow aluminium extrusion and would be provided with a resilient strip 14 that is to abut objects to be supported on the bar 11.

The base 12 has a cavity 15 at the lower end of which there is provided a platform 16. The platform 16 has a passage 17 within which a threaded shaft 18 is slidably supported. The shaft 18 has at its upper end a head 19 with a shaped aperture 20. The threaded shaft 18 is operatively associated with a strap assembly 31. The strap assembly 31 is fixed to the base 12 and engages the vehicle mounting rail so that the end support assembly 10 is secured thereto. More particularly, the strap assembly 31 includes a strap 32 having an eyelet portion 21 to engage a securing tag of the vehicle mounting rail. The assembly 31 further includes a threaded portion 22 threadably engaged with the shaft 18 so that upon angular movement of the shaft 18, about its longitudinal axis 23, the strap 32 is tensioned to securely attach the base 12 to the vehicle roof. More particularly the threaded part 22 is fixed to the strap 32. Accordingly, the assembly 31 is movable by operation of the shaft 18 longitudinally of the axis 23. When the shaft 18 is moved angularly in a first angular direction the strap 32 is tensioned while angular movement in the opposite direction releases the strap 32 to enable removal of the end support assembly 10. The axis 23 is generally vertical.

The bar 11 is secured to the projection 13 by a securing member 41 (preferably a threaded fastener).

Preferably, the projection 13 has an aperture 44 within which the securing member 41 is threadably engaged to attach the rail 11 thereto. The rail 11 is provided with a passage 45 through which the securing member 41 passes.

Pivotally mounted on the base 12 is a cover 24. More particularly the cover 24 is pivotally attached by means of a pivot assembly 25 for pivoting movement about a generally horizontal axis 33, that is an axis generally transverse relative to the axis 23 although displaced therefrom. The cover 24 is movable relative to the cavity 15 between a first position at which it closes the cavity 15, and a second position displaced therefrom so that a user has access to the cavity 15. Preferably, the second position is a raised position at which the cover 24 abuts the base 12 so as to be retained by gravity in the second position. When the cavity 15 is exposed a user is able to insert a tool in the shaped aperture 20 to operate the shaft 18, that is to cause angular movement of the shaft 18 about its axis 23, as well as access to the longitudinal cavity 46 and flanges 47 of the bar 11.

The cover 24 is movable to a third position when released, which position exposes the ends of the flanges 47 and the end of the cavity 46 so that objects may be mounted on the bar by having portions thereof moved along the cavity 46 and engage the flanges 47. This is accomplished via removal of all or part of the resilient strip 14 and replacement of at least a portion thereof when the article is secured to the bar 11. The cover 24 remains captively attached to the base 12.

The resilient strip 14 has longitudinally extending grooves that receive the flanges 47 so as to be secured thereto.

Mounted in the cover 24 is a cylinder lock 26 that is operated by key 34. The cylinder lock 26 includes a projection 27 that is movable angularly between a first position at which the projection 27 engages behind the lip 28 to secure the cover 24 to the base 12 so as to close the cavity 15, and a position spaced from the lip 28 so that the cover 24 may be pivoted to an open position, that is a position exposing the head 19.

Preferably, a mounting gasket 29 is positioned between the base 12 and the vehicle roof, while the base 12 further has projections 30 that project into the vehicle mounting to aid in securing the end support 10 in position.

Preferably, the cover 24 in the closed position abuts the surface 35 of the base 12.

Figure 4:
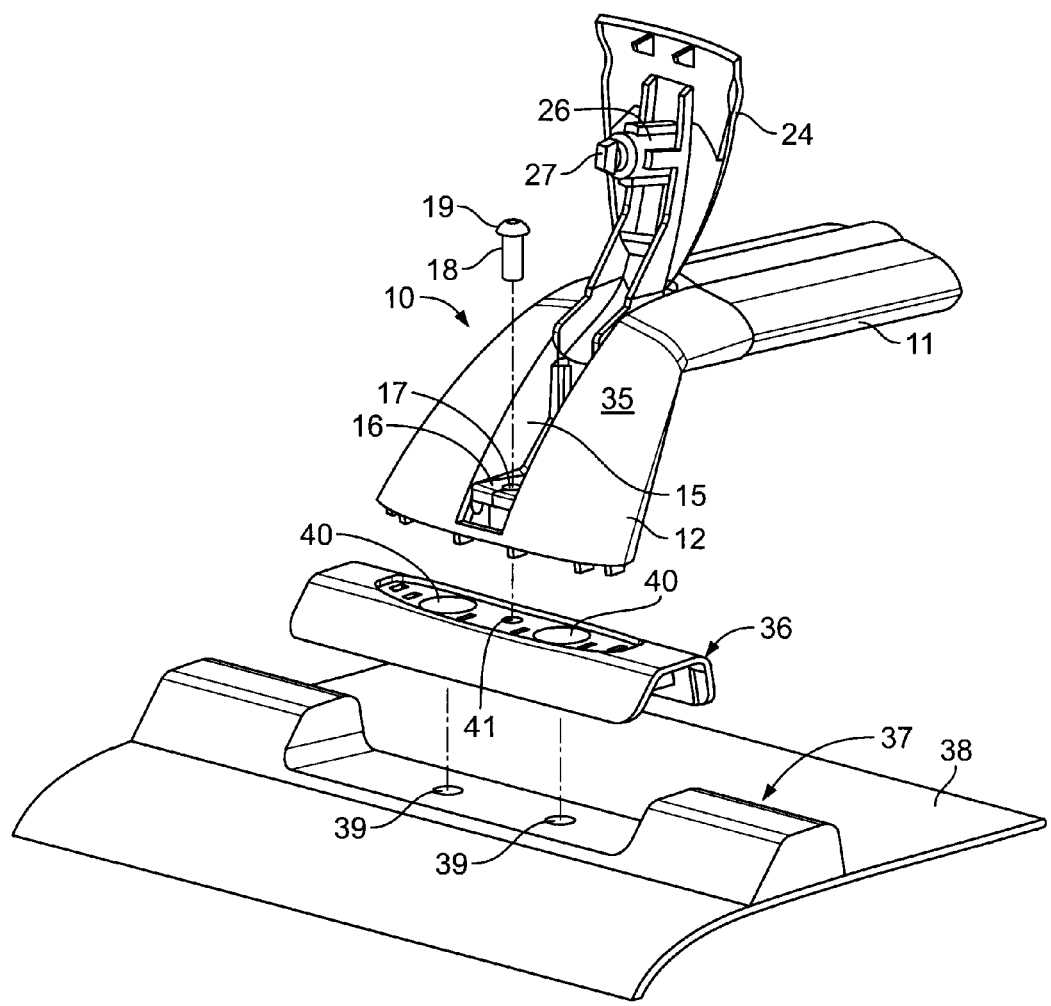
FIG. 4 is a schematic parts sectioned isometric view of a modification of the end mounting of FIGS. 1 to 3.

In FIG. 4 of the accompanying drawings there is schematically depicted a modification of the end support assembly 10 of the previous Figures. In this embodiment, the assembly 10 includes a mounting adaptor 36 that is secured to the vehicle mounting 37 of the vehicle roof 38 by means of threaded fasteners not illustrated. More particularly, the threaded fasteners engage with threaded passages 39 of the mounting 37 and pass through apertures 40 in the mounting adaptor 36.

The mounting adaptor 36 has a further threaded passage 41 that is engaged by the threaded shaft 18.

Again the shaft 18 and securing member 41 are only accessible when the cover 24 is pivoted to a position at which they are exposed. Accordingly, removal of the shaft 18 and/or removal of the securing member 41 are only possible by operation firstly of the key 34.

The pivot assembly 25 of FIGS. 1 and 4 includes pivot projections 42 on opposite sides of the cover 24, with each projection 42 being slidably received within a respective track 43 in the base 12. Accordingly, the cover 24 is movable relative to the base 12 along a path defined by the tracks 43, as well as being pivotable about the axis 33, which axis 33 is movable due to movement of the projections 42. Preferably, said path is in a generally vertical plane.

Preferably the projections 42 are captively located within the tracks 43 so that the cover remains attached to the base 12. In an alternative configuration the projections are removable from the tracks 43 to enable removal of the cover 24.

The claims defining the invention are as follows:

1. A support assembly to secure a roof bar, having a longitudinal mounting portion via which articles are secured to the bar, to a vehicle roof mounting so that in use the bar extends generally transversely across a vehicle, said assembly including:
   a base to which the bar is to be secured;
   a user manipulated part mounted in the base, said user manipulated part including a threaded portion, a securing member connected to said threaded portion, an eyelet opening in said securing member for engaging said vehicle roof mounting, and a threaded shaft to engage said threaded portion;
   a movable cover mounted on the base at a pivot to inhibit access to said user manipulated part and longitudinal mounting portion wherein the pivot is in a first position, the pivot being moveable relative to the base to a second position while the cover remains mounted to the base wherein the longitudinal mount portion is exposed, and the cover being releasable for movement relative to the base to expose said user manipulated part and longitudinal mounting portion;
   a lock operatively associated with the base and cover to secure the cover to said base to inhibit access to said user manipulated part and longitudinal mounting portion, and operable to release the cover for the movement relative to said base; and
   wherein said securing member is tensioned to inhibit repositioning of the bar relative to the vehicle.

2. The support assembly of claim 1, wherein said movement is provided by projections on said cover slidably engaged in tracks in said base.

3. The support assembly of claim 1, wherein said base has a cavity via which the user has access to said user manipulated part, with said cover being movable relative to said base to close said cavity to inhibit said access.

4. The support assembly of claim 1, wherein said securing member is a strap assembly including a strap body to extend between the base and vehicle roof mounting.

5. The support assembly of claim 1 further including a mounting adaptor that is to be secured to the vehicle roof mounting, and wherein said user manipulated part threadably engages said mounting adaptor and is tensioned to secure the assembly to the vehicle.

6. The support assembly of claim 1 wherein said securing member is accessible only when said cover is positioned to provide access thereto.

7. The support assembly of claim 1 further comprising a roof bar, and wherein said mounting portion includes at least one longitudinal flange.

8. The support assembly of claim 1 wherein, said lock includes a lock cylinder mounted in said cover and operable to engage said base.

9. The support assembly of claim 8, wherein said lock cylinder is key operable and includes a projection that is angularly movable between a first position engaged with said base to retain the cover in a position inhibiting access to said user manipulated part, and a second position releasing the cover with respect to the base.

10. The support assembly of claim 1, wherein angular movement of said threaded shaft causes the assembly to be secured or released with respect to the vehicle, said threaded shaft being slidably supported in said base for angular movement about a longitudinal axis of said threaded shaft.

11. The support assembly of claim 10, wherein said longitudinal axis is generally vertically extending when said assembly is mounted on the vehicle.

12. The support assembly of claim 1, wherein said cover is attached to said base.

13. The support assembly of claim 12, wherein said movement of said cover includes pivoting movement about an axis and movement along a predetermined path.

14. The support assembly of claim 13, wherein said axis is generally horizontal when said assembly is secured to said vehicle.

15. The support assembly of claim 14, wherein said path is located generally in a vertical plane when said assembly is secured to the vehicle.

16. A support assembly to secure a roof bar to a vehicle, said assembly comprising:
a base capable of securing the roof bar to the vehicle roof;
a securing member coupled to the base, the securing member capable of securing the base to the vehicle roof;
a track located on the base; and
a cover pivotably mounted on the base at a pivot point, wherein the pivot point is capable of sliding along the track from a first position to a second position and the cover is capable of pivoting to and from a first cover position and a second cover position while moving independently of the securing member.

17. The support assembly of claim 16 further comprising a lock operatively associated with the base and cover to secure the cover to the base and operable to release the cover for sliding along the track.

18. A support assembly to secure a roof bar to a vehicle roof, having a longitudinal mounting portion via which articles are secured to the roof bar, said assembly comprising:
a base capable of securing the roof bar to the vehicle roof;
a securing member coupled to the base, the securing member capable of securing the base to the vehicle roof;
a cover mounted on the base at a pivot, wherein the pivot is moveable relative to the base from a first position to a second position while the cover remains mounted to the base;
wherein in the first position articles are prevented from being secured to the roof bar and the securing member remains secured to the vehicle roof; and
wherein in the second position articles are capable of being secured to the roof bar and the securing member remains secured to the vehicle roof.

19. The support assembly of claim 16, wherein the first cover position is an open position and the second cover position is a closed position.

20. The support assembly of claim 18 wherein the pivot is slidable relative to the base from the first position to the second position.

21. The support assembly of claim 20 further comprising a track located on a first and second side of the base, the pivot capable of sliding along the track to move from the first position to the second position.

* * * * *